Aug. 27, 1957  J. O. HELVERN  2,804,177
AUTOMATIC BRAKE WEAR ADJUSTOR FOR VEHICLES
Filed Jan. 5, 1954  3 Sheets-Sheet 1
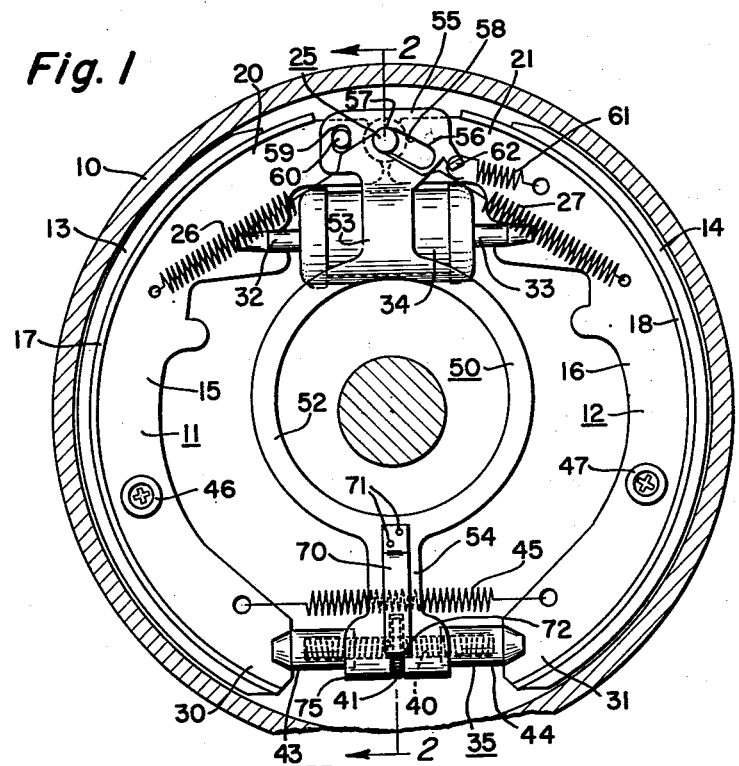
Fig. 1
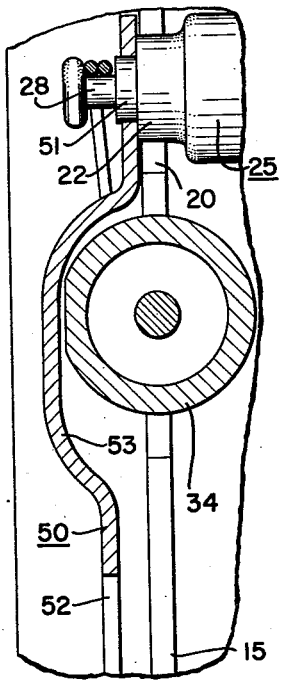
Fig. 2
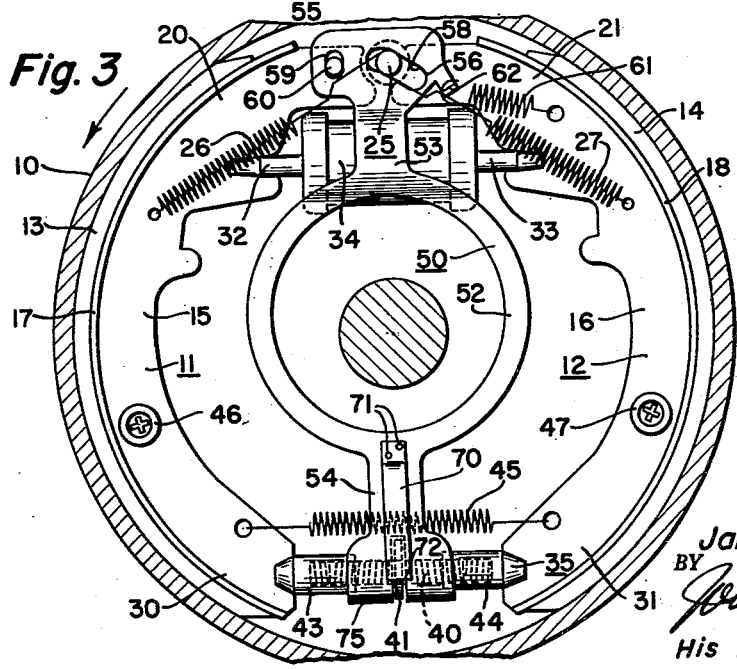
Fig. 3
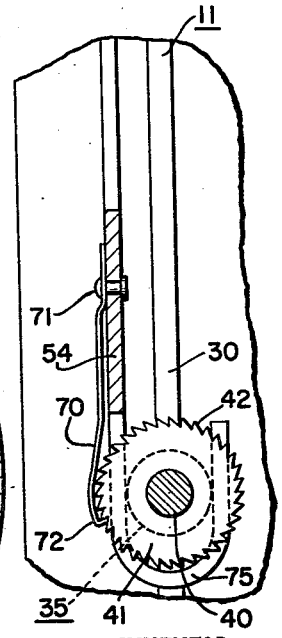
INVENTOR.
James O. Helvern
BY
John T. Martin
His Attorney Aug. 27, 1957  J. O. HELVERN  2,804,177
AUTOMATIC BRAKE WEAR ADJUSTOR FOR VEHICLES
Filed Jan. 5, 1954  3 Sheets-Sheet 2

INVENTOR.
James O. Helvern
BY
His Attorney

Aug. 27, 1957  J. O. HELVERN  2,804,177
AUTOMATIC BRAKE WEAR ADJUSTOR FOR VEHICLES
Filed Jan. 5, 1954  3 Sheets-Sheet 3

INVENTOR.
James O. Helvern
BY
His Attorney

United States Patent Office 2,804,177
Patented Aug. 27, 1957

2,804,177

AUTOMATIC BRAKE WEAR ADJUSTOR FOR VEHICLES

James Oran Helvern, Lewisburg, Ohio, assignor to General Motors Corporation, Detroit, Mich., a corporation of Delaware Application January 5, 1954, Serial No. 402,308

13 Claims. (Cl. 188—79.5)

This invention relates to brake structures for automotive vehicles and particularly to adjusting mechanisms to maintain proper adjustment between the brake shoes and the brake drum of a brake.

An object of the invention is to provide a simplified adjusting mechanism for maintaining automatically a substantially predetermined clearance between the brake shoes and the brake drum of a brake.

It is another object of the invention to provide a device in accordance with the foregoing object wherein operation of one of the brake shoes of a brake actuates the adjusting mechanism to effect brake adjustment between the shoes and the brake drum automatically when the movement of the brake shoes relative to the brake drum exceeds a predetermined movement from an initial rest position.

Still another object of the invention is to provide an adjusting mechanism for a brake to maintain a pre-established clearance between the brake shoes and the brake drum of the brake wherein the adjusting mechanism includes a pendant member suspended from a fixed suspension member for reciprocal movement in response to movement of one of the brake shoes whereby to effect adjustment of the adjusting mechanism when the movement of the actuating brake shoe exceeds a predetermined amount.

Further objects and advantages of the present invention will be apparent from the following description, reference being had to the accompanying drawings wherein a preferred form of the invention is clearly shown.

In the drawings:

Figure 1 is a plan view of a hydraulically operated brake mechanism incorporating the adjusting device of this invention.

Figure 2 is an enlarged transverse cross sectional view taken along line 2—2 of Figure 1.

Figure 3 is a plan view of the brake mechanism of Figure 1 but illustrating it in an operative position effecting brake adjustment.

Figure 4:
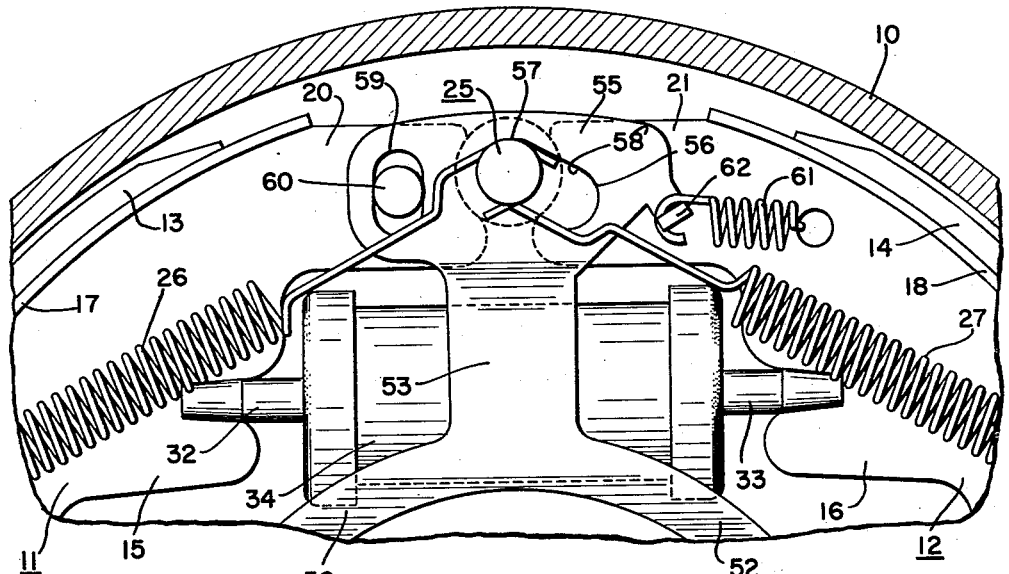
Figure 4 is an enlarged elevational view of a portion of the structure of Figure 1 to more clearly illustrate the operating elements of the adjusting device.
Figure 5:
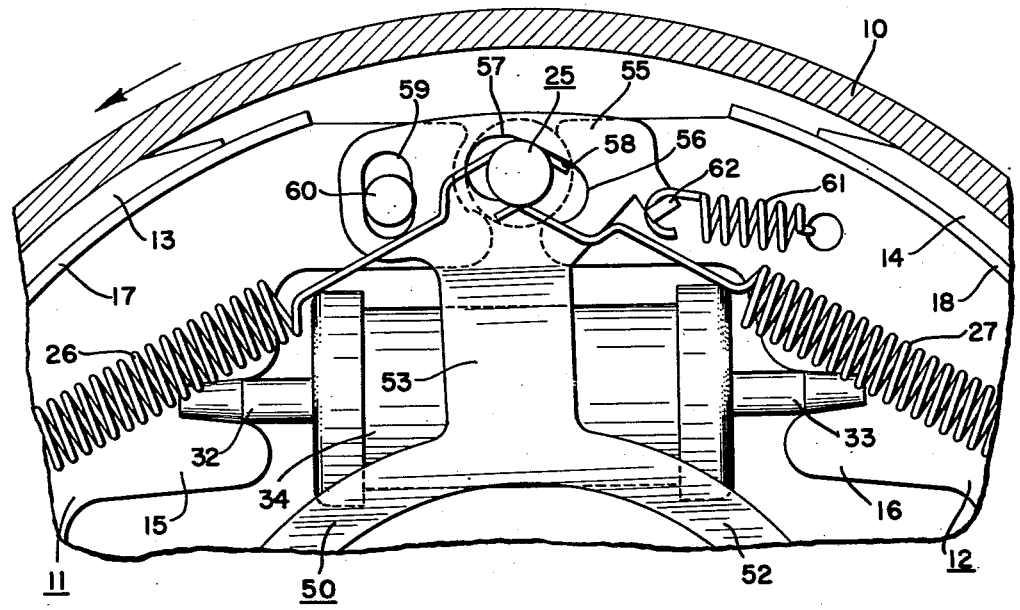
Figure 5 is an enlarged elevational view of the mechanism of Figure 3 to more clearly illustrate the positions of the actuating elements of the adjusting mechanism.

In this invention the brake mechanism comprises a brake drum 10 that is mounted on a vehicle wheel in conventional manner. A pair of brake shoes 11 and 12 are positioned within the brake drum 10 for engagement thereof, suitable brake linings 13 and 14 being provided on the brake shoes 11 and 12 respectively. Each of the brake shoes 11 and 12 comprises the webs 15 and 16 secured to the arcuate members 17 and 18 respectively, which arcuate members support the brake linings 13 and 14.

The upper adjacent ends 20 and 21 of the brake shoes 11 and 12 respectively engage the reduced diameter portion 22 of an anchor pin 25 suitably secured to the backing plate for the brake in conventional manner. Return springs 26 and 27 have one end thereof connected with the webs 15 and 16 respectively and the opposite ends of the return springs hook over a reduced diameter portion 28 projecting from the anchor pin 25 whereby to retain the adjacent ends 20 and 21 against the anchor pin portion 22.

The adjacent lower ends 30 and 31 of the brake shoes 11 and 12 engage an adjusting device 35 which maintains the ends 30 and 31 of the brake shoes in spaced relationship and provides for adjusting the spaced relationship between these ends of the brake shoes and thus effect adjustment of the clearance between the brake linings and the brake drum automatically in a manner hereinafter described.

A hydraulic wheel cylinder 34 having actuating plungers 32 and 33 extending from opposite sides thereof is positioned between the upper adjacent ends 20 and 21 of the brake shoes 11 and 12. The operating plunger 32 engages the web 15 of the brake shoe 11 and the operating plunger 33 engages the web 16 of the brake shoe 12. Admission of hydraulic fluid under pressure into the hydraulic wheel cylinder 34 effects actuation of the brake shoes into engagement with the brake drum 10.

The brake disclosed in this invention is of the Duo-Servo type whereby actuation of the brake shoes by operation of the wheel cylinder 34 first effects engagement of the brake linings with the brake drum with resultant shifting of the brake shoes against the anchor pin 25 to obtain self-energization of the brakes in the well-known manner of this type of brake mechanism.

The adjusting mechanism 35 includes a threaded screw member 40 that has a ratchet wheel 41 positioned at the longitudinal center thereof, the ratchet wheel having a series of ratchet teeth 42, as illustrated in Figure 2. The threaded member 40 has the threaded portions on the left and right hand sides of the ratchet wheel 41, as viewed in Figure 1, provided with left hand and right hand threads respectively. Connecting members 43 and 44 are placed on opposite ends of the threaded member 40 in engagement with the brake shoe ends 30 and 31 respectively. These connecting members 43 and 44 are correspondingly internally threaded relative to the left or right hand end threaded portion of the threaded member 40 so that rotation of the threaded member 40 effected through rotation of the ratchet wheel 41 effects concurrent extension or retraction of the members 43 and 44 to the same degree and thereby adjustment of the brake shoe ends 30 and 31 relative to the brake drum 10. This adjustment of the ends 30 and 31 of the brake shoes 11 and 12 adjusts the clearance space between the brake linings 13 and 14 and the brake drum 10.

A tension spring 45 is positioned between the adjacent ends 30 and 31 of the brake shoes retain these ends in engagement with the connecting members 43 and 44 of the adjusting device 35. Also, the spring 45 may engage the ratchet teeth 42 on the ratchet wheel 41 to apply some resistance to movement of the ratchet wheel, and thereby prevent complete freedom of rotation.

The brake shoes 11 and 12 are supported upon a conventional backing plate by means of the hold down springs 46 and 47 respectively.

The ratchet wheel 41 of the adjusting mechanism 35 is actuated for rotation of the threaded member 40 by means of a pendant member 50 that is suspended from the anchor pin 25 on the reduced diameter portion 51 thereof.

The pendant member comprises a ring portion 52 having an extension 53 on one side thereof and a second extension 54 on the diametrically opposite side. The extension 53 of the pendant member provides the means for suspending the same from the anchor pin 25 whereas the extension 54 provides the means which carries the actuating device for the ratchet wheel 41 of the adjusting mechanism 35.

The upper extension 53 of the pendant member 50 includes a transversely enlarged head 55 that has an angularly positioned slot 56 therein, the slot 56 providing the means for suspending the pendant member 50 from the anchor pin 25 on the reduced diameter portion 51 thereof. The angular slot 56 is positioned angularly toward the axis of the brake drum 10 whereby any transverse movement of the head 55 of the pendant member 50 relative to the axis of the anchor pin 25 effects a reciprocal movement of the pendant member normal to the direction of transverse movement of the head 55 relative to the axis of the anchor pin. While the transverse movement of the head 55 of the pendant member 50 and the reciprocal movement of the pendant member 50 is also transverse of the axis of the anchor pin yet the transverse motion of the head of the pendant member 50 is normal to the reciprocal movement of the pendant member, the transverse motion of the head of the pendant member effecting the reciprocal movement of the pendant member normal thereto.

The angularly disposed slot 56 in the head 55 of the pendant member is provided with a slight flat portion 57 which permits a slight transverse movement of the head of the pendant member 50 without effecting any reciprocal movement of the pendant member before the angular portion 58 of the angular slot 56 engages the anchor pin portion 51 to thereafter effect reciprocal motion of the pendant member 50.

The head 55 of the pendant member 50 is also provided with an elongated slot 59 through which there extends an actuating pin 60 that projects from the end 20 of the brake shoe 11. Thus movement of the brake shoe 11 transversely of the axis of the anchor pin 25 will effect transverse movement of the head 55 of the pendant member 50 relative to the anchor pin 25 for resulting reciprocal operation of the pendant member 50.

A tension spring 61 extends between the end 21 of the brake shoe 12 and a hook 62 on the head 55 of the pendant member to retain the head member 55 in the position illustrated in Figure 4 normally.

The lower extension 54 of the pendant member 50 has a leaf spring member 70 secured thereto by means of rivets 71 and provided on its free end with a ratchet pawl 72 that engages the ratchet teeth 42 on the ratchet wheel 41. When the pendant member 50 is moved in an upward direction, the ratchet pawl 72 will effect rotation of the ratchet wheel 41 by the amount of upward movement of the pendant member 50.

The lower extension 54 of the pendant member 50 has the end thereof formed into a U shaped loop 75 that extends around the connecting members 43 and 44 whereby to guide the reciprocal movement of the lower end of the pendant member relative to the adjusting device 35 and retain the actuating pawl 72 in engagement with the teeth of the ratchet wheel 41.

The operation of the device is such that in normal braking operation of the brakes at a time when no wear has appeared on the brake linings 13 and 14, the adjusting device 35 is adjusted manually by rotation of the ratchet wheel 41 to secure a desired predetermined normal clearance between the brake linings 13 and 14 and the brake drum 10. So long as the clearance between the brake linings 13 and 14 and the drum 10 remains at the established predetermined value, the adjusting device 35 will not be operated to effect any further adjustment between the brake shoes and the brake drum. During this normal operation of the brakes, the head 55 of the pendant member 50 will be moved transversely of the anchor pin 25 by means of the actuating pin 60 but the flat portion 57 of the slot 56 rides upon the anchor pin portion 51 so that there is no reciprocal movement effected to the pendant member 50 by this normal brake actuation.

However, as the brake linings 13 and 14 begin to wear, the clearance between the linings 13 and 14 and the brake shoe 10 gradually increases. Each time the brakes are released the return springs 26 and 27 return the brake shoes to their normal retracted position.

Ultimately, the brake linings will wear sufficiently that when the brake shoes are moved outwardly toward the brake drum the larger movement required of the brake shoes to effect engagement of them with the brake drum will cause a greater transverse movement of the head 55 of the pendant member 50 relative to the axis of the anchor pin 25 so that the angular portion 58 of the slot 56 engages the anchor pin portion 51 and thereby causes the pendant member 50 to ride upwardly relative to the axis of the brake drum and of the anchor pin 25.

When this vertical reciprocal movement of the pendant member becomes greater than the distance between the top of adjacent teeth on the ratchet wheel 41, the ratchet pawl 72 will effect rotation of the ratchet wheel 41 a sufficient amount that when the brakes are released and the head 55 of the pendant member returns to its normal position as illustrated in Figure 4, the ratchet pawl 72 will drop over the next succeeding tooth 42 of the ratchet wheel 41 on the downward movement of the pendant member 50.

Thus, the ratchet pawl 72 reciprocates upon a ratchet tooth 42 without effecting rotation of the threaded member 40 until the reciprocal movement of the pendant member 50 is greater than the distance between adjacent ratchet teeth, at which time the pendant member 50 will effect an adjusting rotation of the threaded member 40 and thereby effect adjustment of the brake shoes 11 and 12 relative to the brake drum 10 to re-establish the predetermined clearance between the brake shoes and the brake drum.

Figure 6:
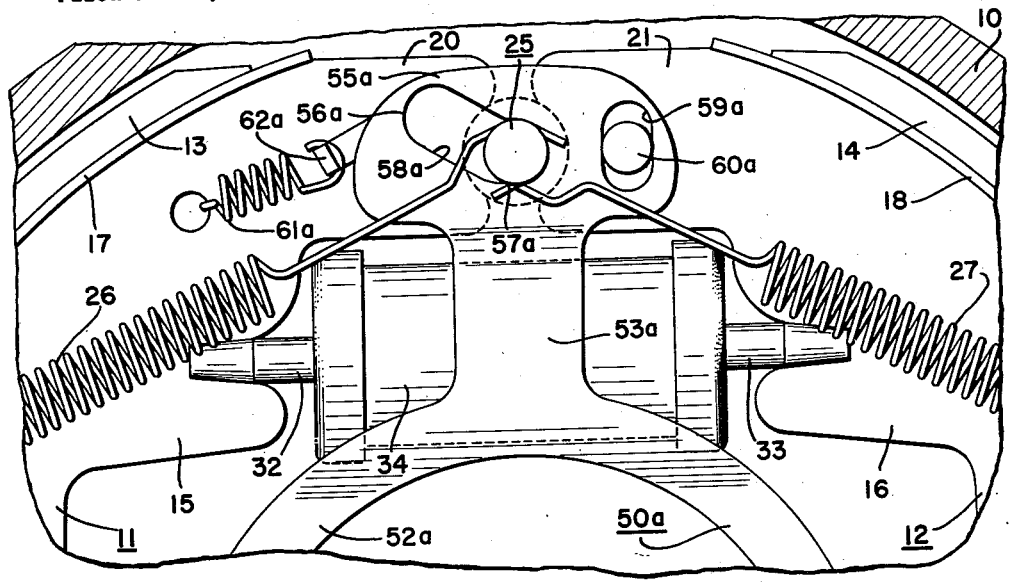
Figure 6 is an elevational view of a portion of the brake structure illustrating a modified arrangement of the operating elements of the adjusting device.
Figure 7:
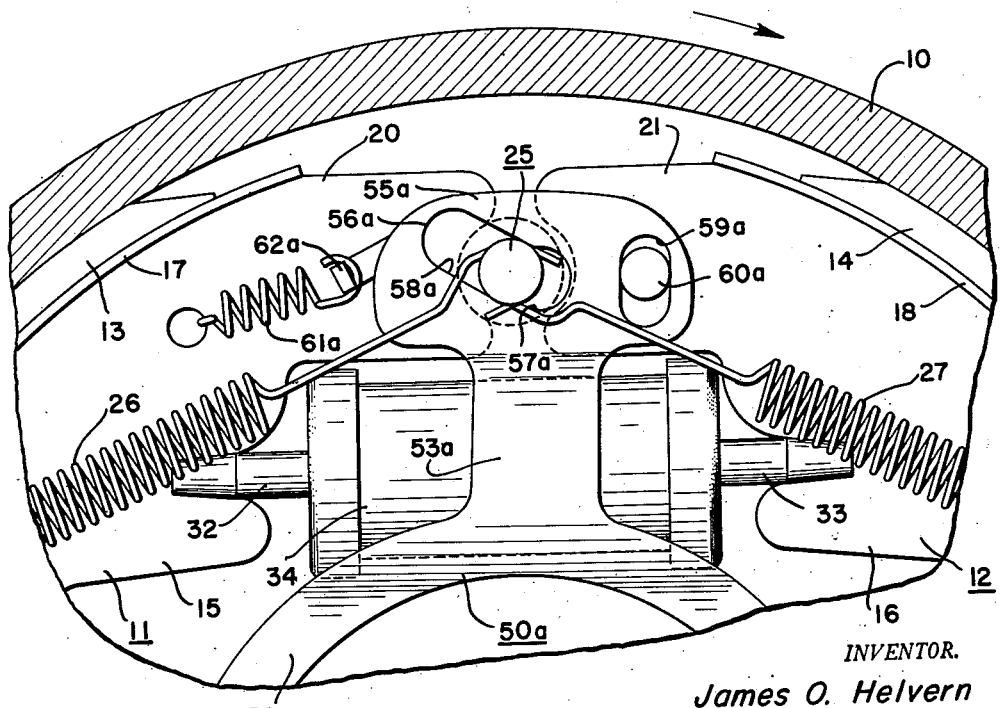
Figure 7 is an elevational view similar to Figure 6 illustrating an operating position of the device of Figure 6.

In Figures 6 and 7 there is illustrated a slightly modified arrangement of the structure of the actuating device for the adjusting mechanism wherein the actuating adjustment of the ratchet wheel 41 occurs by a downward movement of the pendant member in place of the upward movement of the pendant member as illustrated in Figure 2. Also, the actuation of the pendant member occurs by its connection with the brake shoe 21 in place of the connection of brake shoe 20 as illustrated in Figures 1 and 3.

Thus assuming the normal direction of rotation of the drum 10 to be counter-clockwise in the device of Figure 1, brake shoe 20 will be moved each time the brakes are applied, this being considered the normal direction of rotation of the brake drum on forward movement of the automotive vehicle. Thus, at each brake operation on forward movement of the vehicle, the automatic brake adjusting mechanism will not endeavor to make an automatic adjustment of the brake shoes relative to the drum as heretofore described.

With the direction of rotation of the drum 10 of Figures 6 and 7 being counter-clockwise for normal forward movement of the vehicle, the movement of the brake shoe 21 relative to the drum 10 would occur only on reverse movement of the vehicle. Thus, it can be seen that the number of times that automatic brake adjustment would occur in the structure illustrated in Figures 6 and 7 is considerably less than would occur in the structure illustrated in Figures 1 and 3. Further, this would occur usually at a time when the brakes are in a cool condition so that the brake drum is at its minimum diameter. As the brakes are usually put under maximum load conditions and receive maximum heating during stopping of forward motion of the vehicle, it will be appreciated that the structural arrangement of Figures 6 and 7 will not attempt to effect an automatic adjustment of the brake mechanism at a time when the brake drum 10 is in maximum expanded condition due to heating resulting from a heavy service operation.

In the apparatus illustrated in Figures 6 and 7 the pendant member 50a is suspended from the anchor pin 25 in the same manner as heretofore described with reference to the device of Figures 1 and 2. The slot 58a is however positioned angularly opposite to the position of the slot 58 illustrated in Figure 4. Thus, when the brake shoe 21 moves relative to the brake drum 10 the pendant member 50a will be moved downwardly so as to effect movement of the ratchet wheel 41 in the same manner as the upward movement of the pendant member 50 effects movement of the ratchet wheel 41. It will of course be understood that the relationship of the pawl 72 relative to the teeth 42 will have to be reversed to provide for rotation of the ratchet wheel 41 upon such downward movement.

While the form of embodiment of the invention as herein disclosed constitutes a preferred form, it is to be understood that other forms might be adopted as may come within the scope of the claims which follow.

What is claimed is as follows.

1. In a brake structure, an adjusting mechanism for adjusting clearance between the brake shoes and the brake drum of the brake structure, the combination of, a pair of cooperating brake shoes, an adjusting device between two adjacent ends of the brake shoes to effect relative movement between the shoes and including a ratchet wheel to effect brake adjusting actuation of the said device, an anchor pin positioned between the opposite adjacent ends of the shoes, a brake shoe actuating mechanism operably connected with said brake shoes to effect brake action movement of the shoes, a pendant member suspended from said anchor pin and having an angularly related elongated opening therein on which said pendant member is suspended whereby to provide for reciprocable movement of the pendant member transversely of said anchor pin by transverse movement of the pendant member relative to said anchor pin angularly with respect to the line of reciprocation of the pendant member, means connecting the pendant member with one of said shoes adjacent said anchor pin to effect said angularly related transverse movement of said pendant member relative to said anchor pin by movement of said shoe with which said pendant member is connected, resilient means engaging said pendant member holding the same in one extreme position of reciprocation normally, and a ratchet pawl on said pendant member engaging said ratchet wheel to effect rotation thereof and thereby effect brake adjusting actuation of the said adjusting device upon reciprocable movement of the ratchet pawl end of said pendant member a distance greater than the distance between adjacent teeth on said ratchet wheel with said movement is effected by said one brake shoe with which said pendant member is connected for operation thereof.

2. A structure in accordance with claim 1 wherein the suspension of the pendant member and its connection to the one brake shoe is effected at one end of the pendant member and the ratchet pawl is provided at the opposite end of the pendant member.

3. A structure in accordance with claim 1 wherein the pendant member is suspended from the anchor pin at one end of the pendant member and the opposite end of the pendant member receives the ratchet pawl, and the pendant member is provided with a guide element to guide the ratchet pawl end of the pendant member in its reciprocal movement relative to the ratchet wheel.

4. A structure in accordance with claim 1 wherein the pendant member is suspended from the anchor pin at one end thereof and the opposite end of the pendant member is provided with the ratchet pawl engaging the ratchet wheel of the adjusting device with the said opposite end of the pendant member being guided in its reciprocable movement by a guide member provided on the said opposite end of the pendant member adjacent the ratchet pawl and ratchet wheel, and wherein the intermediate portion of the pendant member comprises a hollow ring portion adapted for encircling the axle of the wheel on which the brake structure is mounted.

5. In a brake structure, an adjusting mechanism for adjusting clearance between the brake shoes and the brake drum of the brake structure, the combination of, a pair of cooperating brake shoes, an adjusting device between two adjacent ends of the brake shoes to effect relative movement between the shoes and including a ratchet wheel to effect brake adjusting actuation of the said device, an anchor pin positioned between the opposite adjacent ends of the shoes, a brake shoe actuating mechanism operably connected with said brake shoes to effect brake action movement of the shoes, a pendant member suspended from said anchor pin and having an elongated opening therein on which said pendant member is suspended whereby to provide for reciprocable movement of the pendant member transversely of said anchor pin by transverse movement of the pendant member relative to said anchor pin angularly with respect to the line of reciprocation of the pendant member, said elongated opening having a first portion the longitudinal axis of which is parallel with the transverse movement of the pendant member relative to said anchor pin whereby movement of the pendant member on the anchor pin in the said first portion results in no reciprocal movement of the pendant member, said elongated opening having a second portion extending from said first portion the longitudinal axis of which is angular to the longitudinal axis of the first portion whereby to effect reciprocal movement of the pendant member on the anchor pin upon transverse movement of the pendant member substantially parallel with the axis of the first portion of said opening, means operably connecting the pendant member with one of said shoes adjacent said anchor pin to effect said angularly related transverse movements of said pendant member relative to said anchor pin, and a ratchet pawl on said pendant member engaging said ratchet wheel to effect rotation thereof and thereby effect brake adjusting actuation of the said adjusting device upon reciprocable movement of said pendant member a distance greater than the distance between adjacent teeth on said ratchet wheel as said movement is effected by said one brake shoe with which said pendant member is connected for operation thereof.

6. In a brake structure, an adjusting mechanism for adjusting the clearance between the brake shoes and the brake drum of the brake structure, the combination of, a pair of cooperating brake shoes, an adjusting device between two adjacent ends of the brake shoes to effect relative movement between the shoes for brake shoe adjustment and including an operating member movable to effect brake adjusting actuation of the said device, a stationary anchor pin between opposite adjacent ends of the brake shoes, means resiliently holding opposite adjacent shoe ends against said pin, a brake shoe actuating mechanism operably connected with said brake shoes to effect brake action movement of the shoes relative to said anchor pin, a pendant member having means suspending the same from said anchor pin to provide for movement of the suspension end of the pendant member angularly of the pin with resultant linear reciprocation of the pendant member, means operatively connecting said pendant member with said operating member to actuate the same to effect brake adjusting movement of said device by said linear reciprocation of the reciprocable member, and connecting means connecting the suspension end of said pendant member with one of said shoes to effect reciprocation of the said pendant member by movement of the said one shoe transversely relative to said anchor pin.

7. A structure in accordance with claim 6 wherein the operating member comprises a ratchet wheel and the pendent member includes a ratchet wheel engaging pawl to effect operation of the ratchet wheel upon reciprocation of the pendant member a distance greater than that between adjacent teeth of the ratchet wheel.

8. Apparatus in accordance with claim 6 wherein the means suspending the pendant member from the anchor pin comprises an elongated opening in the suspension end of the pendant member disposed angular to the reciprocal movement of the pendant member to effect the said reciprocation of the pendant member transversely of the anchor pin upon angular movement of the suspension end of the pendant member relative to the anchor pin.

9. Apparatus in accordance with claim 6 wherein the means suspending the pendant member comprises an elongated opening in the suspension end of the pendant member angular to the said reciprocal movement of the pendant member suspending the same from the anchor pin to provide for said reciprocation of the pendant member transversely of the anchor pin on movement of the suspension end by the said connecting means between the suspension end and one of said shoes, and wherein resilient means is operatively connected with said pendant member to retain the same normally in one extreme position of reciprocation during inactivity of the brake structure.

10. In a brake structure, an adjusting mechanism for adjusting the clearance between the brake shoes and the brake drum of the brake structure, the combination of, a pair of cooperating brake shoes, an adjusting device between two adjacent ends of the brake shoes to effect relative movement between the shoes for brake shoe adjustment and including an operating member movable to effect brake adjusting actuation of the said device, a stationary pin adjacent opposite adjacent ends of the brake shoes, means suspending a pendant member on said pin with the suspension end of the pendant member movable on the pin to effect resultant linear reciprocation of the opposite end of said pendant member, said opposite end of said pendant member having means operatively connecting the same with said operating member to actuate the same to effect brake adjusting movement of said device on said linear reciprocation of said opposite end of the pendant member, and connecting means connecting said pendant member with one of said shoes to effect said movements of said pendant member with said resultant reciprocation of the said pendant member by brake action movement of the said one shoe.

11. A structure in accordance with claim 10 wherein the said means suspending said pendant member comprises a slot disposed angular to the direction of reciprocation of said opposite end of the pendant member to provide for said reciprocation of the pendant member upon movement thereof relative to said pin, the said connecting means connecting the pendant member with the said one shoe permitting some relative movement between said one shoe and said pendant member.

12. A brake structure in accordance with claim 10 in which said means suspending said pendant member comprises a slot suspending the same from the said pin with said slot having a first portion substantially normal to the reciprocal movement imparted to said pendant member by the said one shoe and a second portion angular to the first portion whereby to respectively provide for non-reciprocation of the pendant member during a part of the movement of the said one brake shoe and reciprocation during another part of the movement of the brake shoe.

13. A structure in accordance with claim 10 wherein the operating member comprises a ratchet member, and the pendant member includes a pawl engaging the ratchet member to effect movement of the ratchet member upon reciprocable travel of the pendant member greater than the distance between adjacent teeth of the ratchet member.

References Cited in the file of this patent
UNITED STATES PATENTS

| | | |
|---|---|---|
| 2,230,837 | Harvey et al. | Feb. 4, 1941 |
| 2,264,454 | Para | Dec. 2, 1941 |
| 2,292,018 | Smith | Aug. 4, 1942 |
| 2,414,037 | Geyer | Jan. 7, 1947 |